US012759395B2

(12) United States Patent
Aguirre Miranda et al.

(10) Patent No.: US 12,759,395 B2
(45) Date of Patent: Oct. 13, 2026

(54) VERTICAL INSTALLATION OF DISPLAY MODULES IN VEHICLES

(71) Applicant: Nissan North America, Inc., Franklin, TN (US)

(72) Inventors: Francisco Ruben Aguirre Miranda, Calimaya City (MX); Silverio Ramirez, Mexico City (MX); Axel Cristhian Gonzalez Infante, Toluca City (MX)

(73) Assignee: Nissan North America, Inc., Franklin, TN (US)

( * ) Notice: Subject to any disclaimer, the term of this patent is extended or adjusted under 35 U.S.C. 154(b) by 341 days.

(21) Appl. No.: 18/394,638

(22) Filed: Dec. 22, 2023

(65) Prior Publication Data

US 2025/0206133 A1 Jun. 26, 2025

(51) Int. Cl.

*B60K 35/22* (2024.01)
*B60K 35/60* (2024.01)
*B60K 37/20* (2024.01)
*B60R 11/02* (2006.01)
*B60R 11/00* (2006.01)

(52) U.S. Cl.

CPC .............. *B60K 35/22* (2024.01); *B60K 35/60* (2024.01); *B60K 37/20* (2024.01); *B60R 11/0229* (2013.01); *B60K 2360/658* (2024.01); *B60K 2360/693* (2024.01); *B60K 2360/816* (2024.01); *B60R 2011/0005* (2013.01); *B60R 2011/0043* (2013.01)

(58) Field of Classification Search

None
See application file for complete search history.

(56) References Cited

U.S. PATENT DOCUMENTS 4,784,285 A * 11/1988 Patel ...................... B62D 25/24 220/782
6,802,559 B2 * 10/2004 Yoshihara ............ B62D 25/142 296/70
8,109,812 B2 * 2/2012 Chopra .................. B60H 1/247 454/143

(Continued)

FOREIGN PATENT DOCUMENTS

CN 206644646 U 11/2017
CN 210706903 U 6/2020

(Continued)

*Primary Examiner* — Aaron L Lembo
(74) *Attorney, Agent, or Firm* — Young Basile Hanlon & MacFarlane, P.C.

(57) ABSTRACT

A vehicle that includes: a crossbeam that extends along a width of the vehicle; an instrument panel that is supported by the crossbeam and which includes an opening; support brackets that are connected to the crossbeam; a display module that is positioned within the opening and which includes display brackets that are connected to the support brackets such that the display module is supported by the crossbeam; a duct assembly that is supported by the instrument panel such that the duct assembly is spaced axially from an inner surface of the instrument panel along a length of the vehicle so as to define an access channel that facilitates access to the display brackets and connection of the display module to the support brackets; and a vent that extends into the duct assembly such that the vent is positioned vertically above the display module.

20 Claims, 6 Drawing Sheets

(56) References Cited

U.S. PATENT DOCUMENTS

| | | | | | |
|---|---|---|---|---|---|
| 10,076,958 | B1 * | 9/2018 | Raines | ............... | B60H 1/00564 |
| 10,583,739 | B2 * | 3/2020 | Yoshimura | ........... | B60H 1/0055 |
| 11,054,685 | B2 * | 7/2021 | Faraj | ...................... | B60K 37/00 |
| 11,414,024 | B2 * | 8/2022 | Zimkiewicz | ............ | B60R 11/02 |
| 2018/0251012 | A1 * | 9/2018 | Sano | .................... | B60H 1/3407 |
| 2024/0042853 | A1 * | 2/2024 | Rottmann | ............ | B62D 25/145 |

FOREIGN PATENT DOCUMENTS

| | | | | |
|---|---|---|---|---|
| CN | 212637339 | U | | 3/2021 |
| CN | 216861354 | U | | 7/2022 |
| DE | 202008002082 | U1 | | 5/2008 |
| DE | 102018110548 | B4 | | 10/2020 |
| JP | H0939606 | A | * | 2/1997 |
| JP | 2023080508 | A | | 6/2023 |

* cited by examiner

FIG. 1
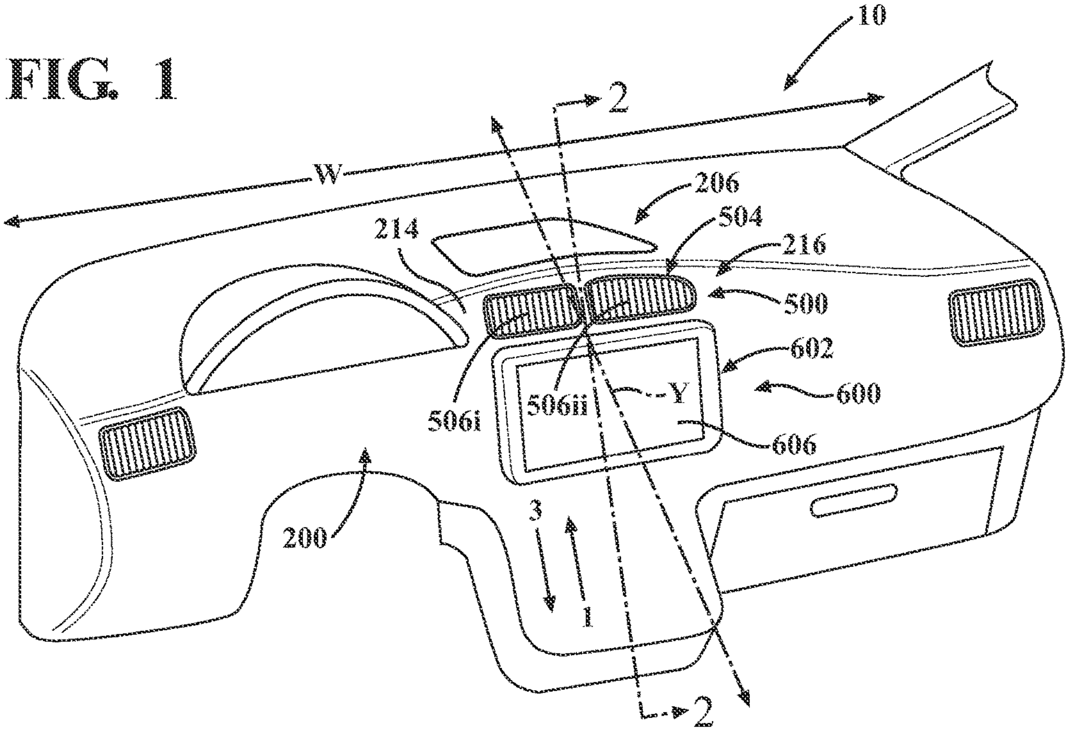
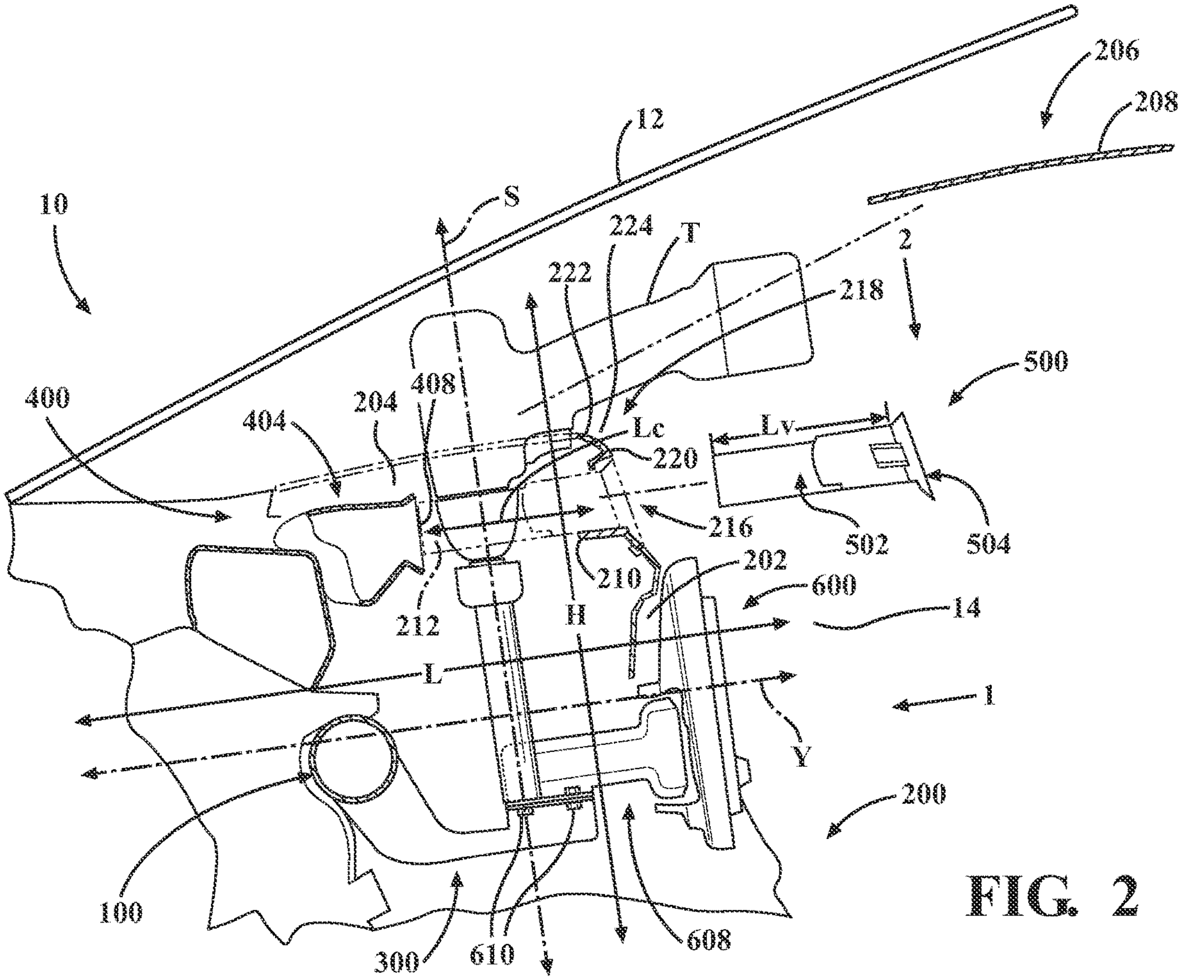
FIG. 2

VERTICAL INSTALLATION OF DISPLAY MODULES IN VEHICLES

TECHNICAL FIELD

The present disclosure relates to the installation of display modules in vehicles.

BACKGROUND

In modern vehicles, display modules include a variety of components that support a wide range of functions. For example, display modules often include a GPS component, a radio (or other such audio component(s)), temperature controls, a (touch) screen, etc. Display modules are generally installed from inside the passenger compartment (cabin) of the vehicle in an axial (i.e., forward) direction in that vertical installation is often inhibited (if not entirely prevented) by the presence of additional systems and components (e.g., the heating, ventilation, and air conditioning (HVAC) system), particularly in those vehicles in which the vent(s) are located vertically above the display module.

The present disclosure addresses this deficiency, however, and facilitates the vertical installation of display modules in vehicles, which not only simplifies assembly and disassembly during installation and maintenance, but allows for the use of a larger display modules and the installation of the vent(s) vertically above the display modules.

SUMMARY

In one aspect of the present disclosure, a vehicle is disclosed that includes: a crossbeam that extends along a width of the vehicle; an instrument panel that is supported by the crossbeam and which includes an opening; support brackets that are connected to the crossbeam; a display module that is positioned within the opening and which includes display brackets that are connected to the support brackets such that the display module is supported by the crossbeam; a duct assembly that is supported by the instrument panel such that the duct assembly is spaced axially from an inner surface of the instrument panel along a length of the vehicle so as to define an access channel that facilitates access to the display brackets and connection of the display module to the support brackets; and a vent that extends into the duct assembly such that the vent is positioned vertically above the display module.

In certain embodiments, the duct assembly may be configured such that the access channel defines a length that extends in generally parallel relation to the length of the vehicle.

In certain embodiments, the length of the access channel may lie substantially within the range of approximately 80 mm to approximately 120 mm.

In certain embodiments, the vehicle may further include a cover plate that is removably connected to the instrument panel such that the cover plate conceals the access channel.

In certain embodiments, the duct assembly may include a pair of side ducts and a center duct that is connected to the pair of side ducts.

In certain embodiments, the pair of side ducts and the center duct may be integrally formed.

In certain embodiments, the pair of side ducts and the center duct may be formed as discrete components of the duct assembly.

In certain embodiments, the pair of side ducts and the center duct may be connected via mechanical fasteners.

In certain embodiments, the center duct may be asymmetrically configured about a centerline thereof that extends in generally parallel relation to the length of the vehicle.

In certain embodiments, the display brackets may include first flanges that extend in generally parallel relation to the length of the vehicle and second flanges that extend in generally orthogonal relation to the first flanges along a height of the vehicle.

In certain embodiments, the display brackets may include first flanges that extend in generally parallel relation to the length of the vehicle and second flanges that extend in generally orthogonal relation to the first flanges along the width of the vehicle.

In another aspect of the present disclosure, a vehicle is disclosed that includes: a crossbeam that extends along a width of the vehicle; an instrument panel that is supported by the crossbeam and which includes an opening that defines an insertion axis; support brackets that are connected to the crossbeam; a display module that is positioned within the opening and which includes display brackets that are directly connected to the support brackets by mechanical fasteners that extend in generally orthogonal relation to the insertion axis; and a cover plate that is removably connected to the instrument panel to facilitate access to the display brackets with an installation tool during connection of the display brackets to the support brackets.

In certain embodiments, the vehicle may further include a duct assembly that is supported by the instrument panel.

In certain embodiments, the duct assembly may include a pair of side ducts and a center duct that is connected to the pair of side ducts.

In certain embodiments, the center duct may be spaced axially from an inner surface of the instrument panel along a length of the vehicle so as to define an access channel that is configured to receive the installation tool and facilitate access to the display brackets.

In certain embodiments, the center duct may be configured such that the access channel defines a length that extends in generally parallel relation to the length of the vehicle.

In certain embodiments, the length of the access channel may lie substantially within the range of approximately 80 mm to approximately 120 mm.

In certain embodiments, the vehicle may further include a vent that extends into the center duct such that the vent is positioned vertically above the display module.

In another aspect of the present disclosure, a method of assembling a vehicle is disclosed. The method includes: installing a duct assembly in an instrument panel of the vehicle; inserting a display module into the instrument panel along an insertion axis that extends in generally parallel relation to a length of the vehicle; positioning first brackets on the display module adjacent to second brackets that are connected to a crossbeam that extends along a width of the vehicle; inserting an installation tool into an access channel that is defined between the duct assembly and the instrument panel; and using the installation tool to directly connect the first brackets and the second brackets via mechanical fasteners such that the mechanical fasteners extend in generally orthogonal relation to the insertion axis.

In certain embodiments, the method may further include removably installing a cover plate in the instrument panel such that the cover plate conceals the access channel.

In certain embodiments, installing the duct assembly may include installing a pair of side ducts and a center duct that is connected to the pair of side ducts, wherein the center duct is configured such that the access channel defines a length extending in generally parallel relation to the length of the vehicle that lies substantially within a range of approximately 80 mm to approximately 120 mm.

In certain embodiments, installing the duct assembly may include positioning the center duct such that the center duct is spaced axially from an inner surface of the instrument panel along the length of the vehicle to thereby define the access channel.

In certain embodiments, the method may further include inserting a vent into the center duct through the instrument panel such that the vent is positioned vertically above the display module.

BRIEF DESCRIPTION OF THE DRAWINGS

According to common practice, the various features of the drawings may not be to scale and may be arbitrarily expanded or reduced for clarity.

FIG. 1 is a rear, perspective view of an instrument panel in a vehicle according to the principles of the present disclosure.

FIG. 2 is a cross-sectional view taken along line 2-2 in FIG. 1 illustrating the installation of a display module in the instrument panel.

DETAILED DESCRIPTION

Figure 3:
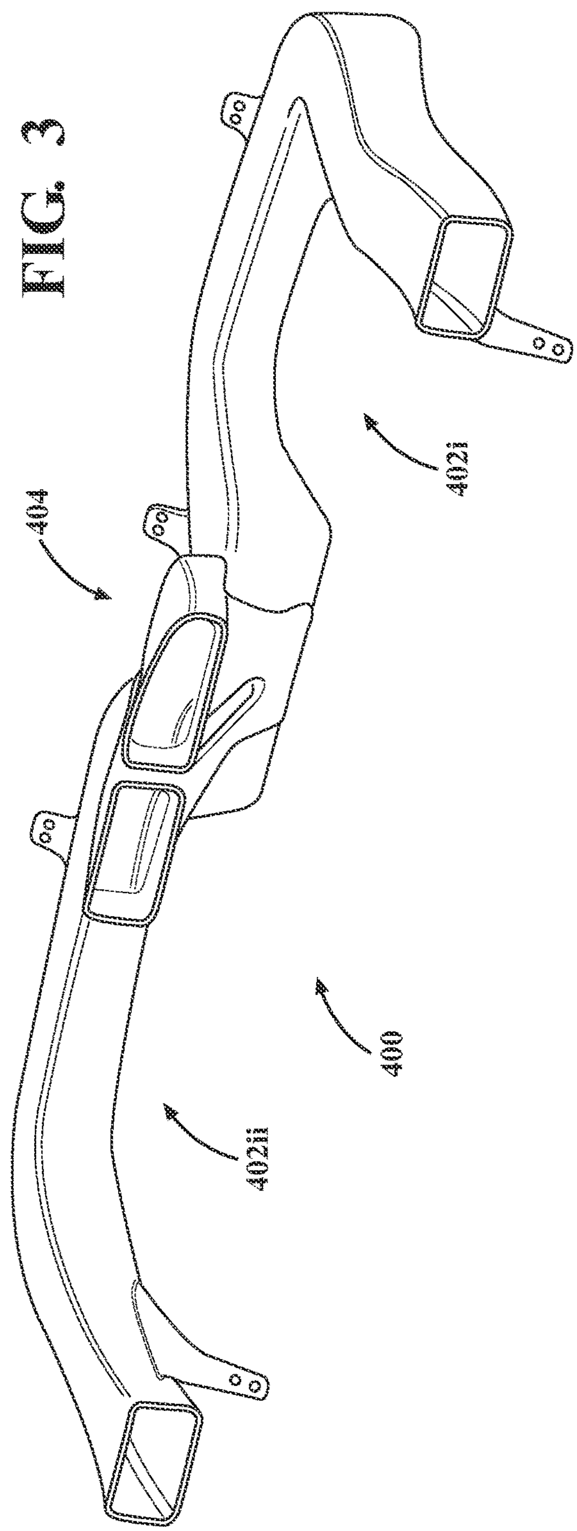
FIG. 3 is a front, perspective view of a duct assembly in the vehicle.

The present disclosure describes a vehicle that is configured to permit the vertical installation of a display module in an instrument panel thereof. More specifically, during installation, the display module is inserted into an opening in the instrument panel and mechanical fasteners are utilized to connect brackets on the display module to brackets extending from a crossbeam in the vehicle such that the mechanical fasteners are installed in a generally vertical orientation. In order to facilitate such installation, the vehicle includes a duct assembly having a center duct with a reduced length, which creates axial spacing between the center duct and an inner (rear, forward facing) surface of the instrument panel (i.e., along the length of the vehicle, which extends between a front end of the vehicle and a rear end of the vehicle) so as to define a vertical channel (gap) that provides access to the brackets in order to install the mechanical fasteners.

With reference to FIGS. 1 and 2, a vehicle 10 is disclosed that includes: a crossbeam 100; an instrument panel 200; (first) support brackets 300, which are connected (secured) (e.g., welded) to and extend (rearwardly) from the crossbeam 100; a duct assembly 400, which is a component of the HVAC system in the vehicle 10; one or more vents 500 that extends into the duct assembly 400; and a display module 600. Although generally illustrated and described in the context of a passenger vehicle, it should be appreciated that the various components described herein may be configured for use with a wide variety of vehicles (e.g., trucks, SUVs, vans, buses, boats, airplanes, etc.).

The crossbeam 100 extends along (i.e., in generally parallel relation to) a width W (FIG. 2) of the vehicle 10 and supports the instrument panel 200 as well as a variety of other components of the vehicle 10. In addition, the crossbeam 100 increases the overall stiffness of the vehicle 10 and assists in managing side impact loads.

The instrument panel 200 is supported by (e.g., is directly or indirectly connected (secured) to) the crossbeam 100 and includes: a (first, axial) opening 202; a (second, vertical) opening 204; and a cover plate 206 (e.g., a lid 208).

The opening 202 extends into the instrument panel 200 and is configured to receive the display module 600. More specifically, the opening 202 defines an insertion axis Y that extends in generally parallel relation to a length L of the vehicle 10 such that, during installation of the display module 600, the display module 600 is inserted into the instrument panel 200 along the insertion axis Y in a forward direction 1, as described in further detail below.

The opening 204 extends into the instrument panel 200 in generally orthogonal relation to the opening 202 and is configured to receive an installation tool T, as discussed in further detail below. More specifically, as seen in FIG. 2, the opening 204 defines a service (connection) axis S, which extends along (i.e., in generally parallel relation to) a height H of the vehicle 10 and in generally orthogonal relation to the length L of the vehicle 10 (and the insertion axis Y).

The cover plate 206 is removably connected to the instrument panel 200 and is configured for insertion into the opening 204. More specifically, the opening 204 and the cover plate 206 are spaced axially from the vent(s) 500 in the forward direction 1 (i.e., closer to a windshield 12 of the vehicle 10).

With reference now to FIGS. 3-6 as well, the duct assembly 400 is connected (secured) to or otherwise (directly or indirectly) supported by the instrument panel 200 such that the duct assembly 400 is spaced axially along (i.e., in generally parallel relation to) the length L of the vehicle 10 (and the insertion axis Y). More specifically, the duct assembly 400 is spaced from an inner (rear, forward facing) surface 210 of the instrument panel 200 so as to define a generally vertical access channel (gap) 212 (FIGS. 2, 5, 6) that extends within the instrument panel 200 along (i.e., in generally parallel relation to) the height H of the vehicle 10 (and the service axis S). The access channel 212 defines a length Lc that extends along (i.e., in generally parallel relation to) the length L of the vehicle 10 (and the insertion axis Y) and is configured to receive the installation tool T. As described in further detail below, the access channel 212 thus facilitates both access to the display module 600 and connection of the display module 600 to the support brackets 300.

The duct assembly 400 includes a pair of side ducts 402*i*, 402*ii* (FIGS. 3, 4) and a center duct 404 that is connected to the pair of side ducts 402*i*, 402*ii*.

In the embodiment illustrated in FIG. 3, the duct assembly 400 is monolithic (unitary) in construction, whereby the pair of side ducts 402*i*, 402*ii* and the center duct 404 are integrally formed (i.e., from a single piece of material).

Figure 4:
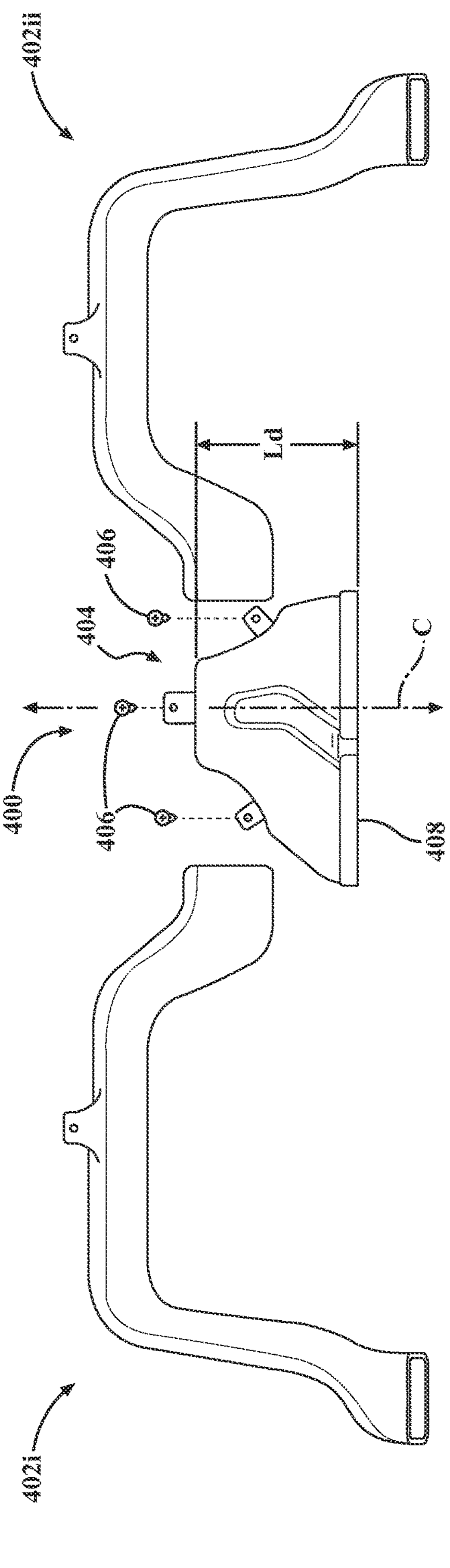
FIG. 4 is a top, plan view of the duct assembly shown with parts separated.
Figure 5:
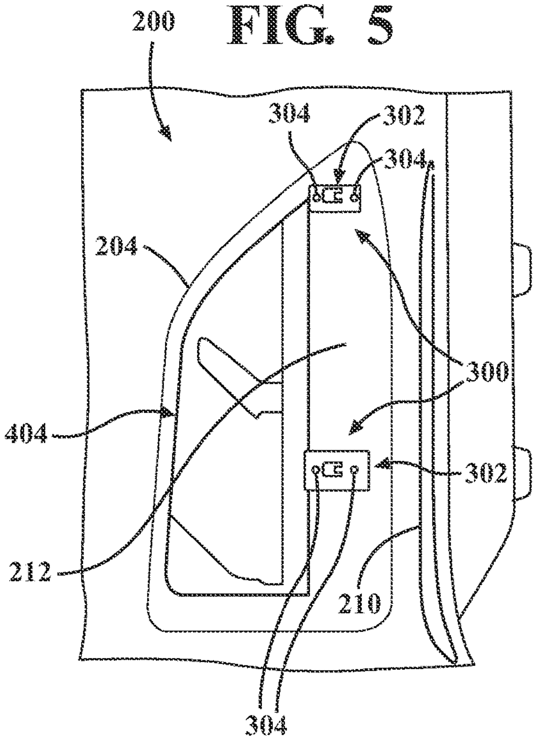
FIG. 5 is a partial, top, plan view of the instrument panel.
Figure 6:
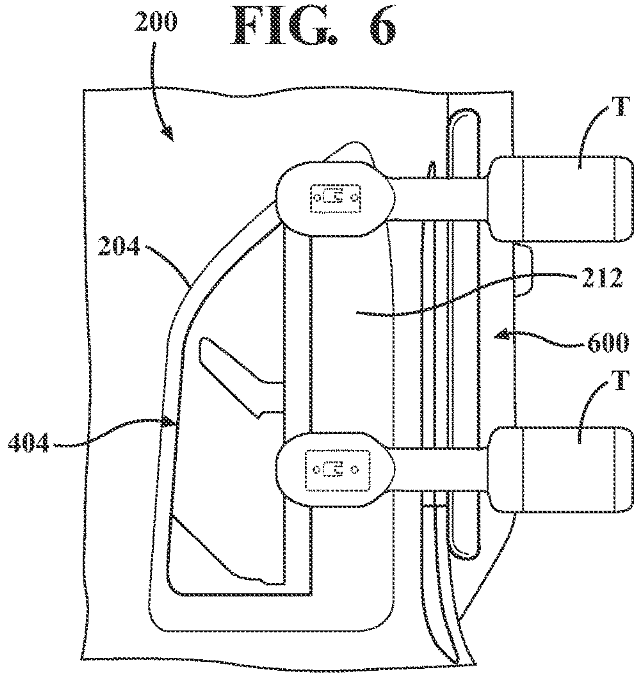
FIG. 6 is a partial, top, plan view of the instrument panel shown with an installation tool inserted into a vertical access channel during installation of the display module.

In the embodiment illustrated in FIG. 4, by contrast, the pair of side ducts 402*i*, 402*ii* and the center duct 404 are formed as discrete (separate) components of the duct assembly 400, which reduces flow separation through the duct assembly 400 and increases performance of the duct assembly 400 by reducing both resistance and turbulence. More specifically, in the embodiment illustrated in FIG. 4, the pair of side ducts 402*i*, 402*ii* and the center duct 404 are connected via mechanical fasteners 406 (e.g., bolts, screws, rivets, pins, clips, etc.). Embodiments of the duct assembly 400 that are devoid of the mechanical fasteners 406 are also envisioned herein, however. For example, an embodiment in which the pair of side ducts 402*i*, 402*ii* and the center duct 404 may be configured for connection in an interference (press) fit would not be beyond the scope of the present disclosure.

As seen in FIGS. 2 and 4, the center duct 404 is positioned vertically above the display module 600 and is asymmetrically configured about a centerline C thereof, which extends along (i.e., in generally parallel relation to) the length L of the vehicle 10 (and the insertion axis Y). The asymmetrical configuration of the center duct 404 accounts for spatial restrictions within the instrument panel 200 in order to accommodate (e.g., avoid contact with) other components of the vehicle 10.

The center duct 404 defines a length Ld (FIG. 4) that extends along (i.e., in generally parallel relation to) the length L of the vehicle 10 (and the insertion axis Y) and includes an outlet 408, which is spaced from the inner surface 210 of the instrument panel 200 so as to define the aforementioned access channel 212.

In the illustrated embodiment, the center duct 404 is configured such that the length Ld lies substantially within the range of approximately 75 mm to approximately 150 mm (e.g., approximately 120 mm) and the length Lc lies substantially within the range of approximately 80 mm to approximately 120 mm (e.g., approximately 100 mm). Depending upon the specific configuration of the instrument panel 200, the duct assembly 400, airflow requirements, etc., however, embodiments in which the center duct 404 may be configured such that the length Ld and/or the length Lc lies outside of the corresponding disclosed range are also envisioned herein and would not be beyond the scope of the present disclosure.

The vent(s) 500 span the access channel 212 and extend into the duct assembly 400 (i.e., the center duct 404) through the instrument panel 200 in order to direct airflow from the duct assembly 400 into a passenger compartment (cabin) 14 (FIG. 2) of the vehicle 10. More specifically, the vent(s) 500 include a body portion 502 (FIG. 2) (also referred to as an internal component), which extends into the duct assembly 400 (i.e., the center duct 404) and defines a length Lv that extends along (i.e., in generally parallel relation to) the length L of the vehicle 10 (and the insertion axis Y), and a skirt 504 (FIGS. 1, 2) (also referred to as an external component), which is connected (secured) to the body portion 502 and is located (positioned) adjacent to an exposed (rear) surface 214 of the instrument panel 200 within the passenger compartment 14.

It is envisioned that the vent(s) 500 (i.e., the body portion 502) and the duct assembly 400 (i.e., the center duct 404) may be connected (secured) in any suitable manner. For example, in the illustrated embodiment, the vent(s) 500 are configured to mate with (engage) the center duct 404 (e.g., in an interference (press) fit). Embodiments in which the vent(s) 500 and the center duct 404 may be configured for connection via one or more mechanical fasteners are also envisioned herein, however, and would not be beyond the scope of the present disclosure.

In the illustrated embodiment, the body portion 502 of the vents(s) 500 define a length Lv (FIG. 2) that extends along (i.e., in generally parallel relation to) the length L of the vehicle 10 (and the insertion axis Y) that lies substantially within the range of approximately 100 mm to approximately 140 mm (e.g., approximately 120 mm), which allows the body portion 502 to mate with (engage) the center duct 404. Depending upon the particular configurations of the vent(s) 500 and/or the center duct 404, airflow requirements, etc., however, embodiments in which the vent(s) 500 may be configured such that the length Lv lies outside of the disclosed range are also envisioned herein and would not be beyond the scope of the present disclosure.

Although shown as including a bifurcated configuration that defines a pair of outlets 506*i*, 506*ii* (FIG. 1), it is envisioned that the particular configuration of the vent(s) 500 may be varied in alternate embodiments. For example, embodiments including a single outlet 506 are also envisioned herein, as are embodiments including three or more outlets 506.

As seen in FIGS. 1 and 2, the vent(s) 500 are positioned vertically above the display module 600 within a bulkhead 216 that is defined by the instrument panel 200. The bulkhead 216 extends vertically upward (i.e., along the height H of the vehicle 10 and towards the windshield 12) and elevates (raises) the position of the vent(s) 500, which creates additional (vertical) space in order to accommodate the installation of a larger display module 600.

In order to facilitate insertion of the installation tool T into the opening 204 and the access channel 212, the bulkhead 216 includes an arcuate (curved) outer profile (contour) 218. More specifically, the bulkhead 216 includes an outer surface 220 that extends downwardly (and rearwardly) from an uppermost surface 222 thereof in order to define a relief 224, which defines negative space that accommodates insertion of the installation tool T into the access channel 212 as well as the manipulation (e.g., repositioning, maneuvering) and the use thereof.

Figure 7:
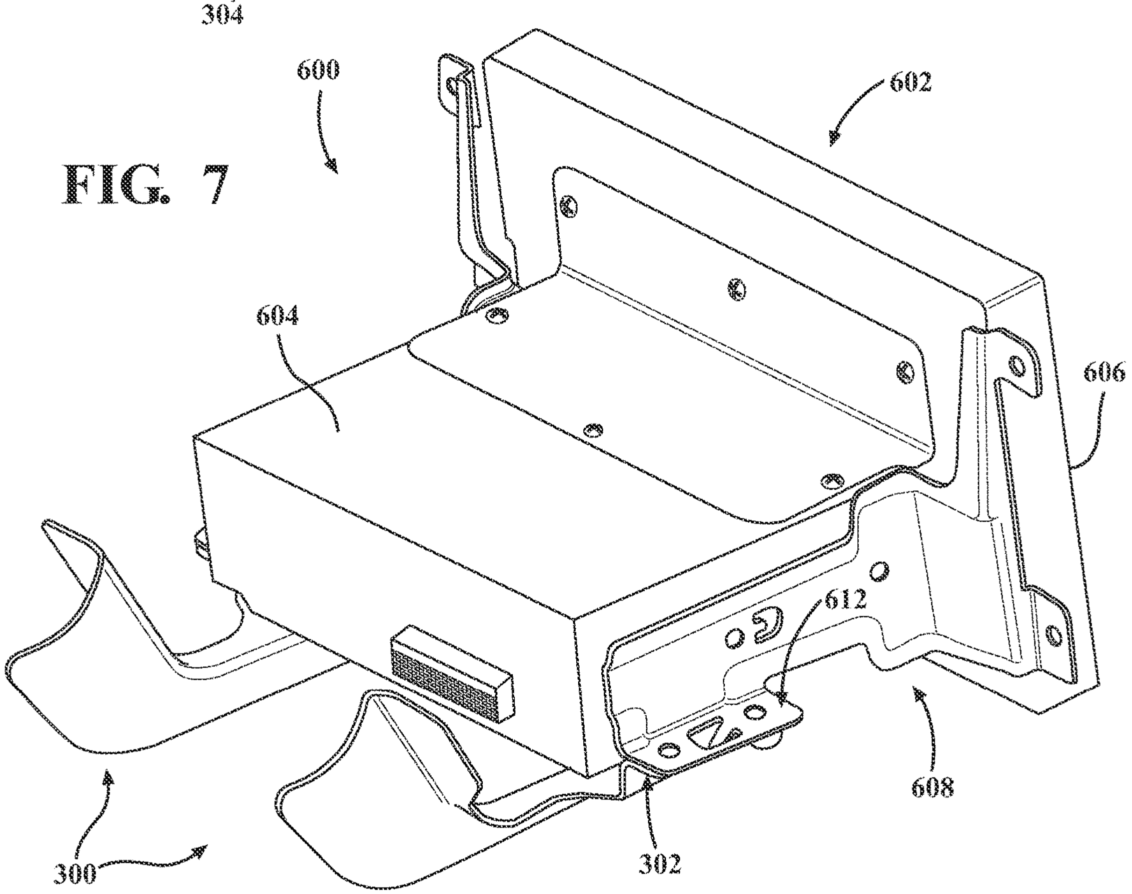
FIG. 7 is a front, perspective view of the display module.
Figure 8:
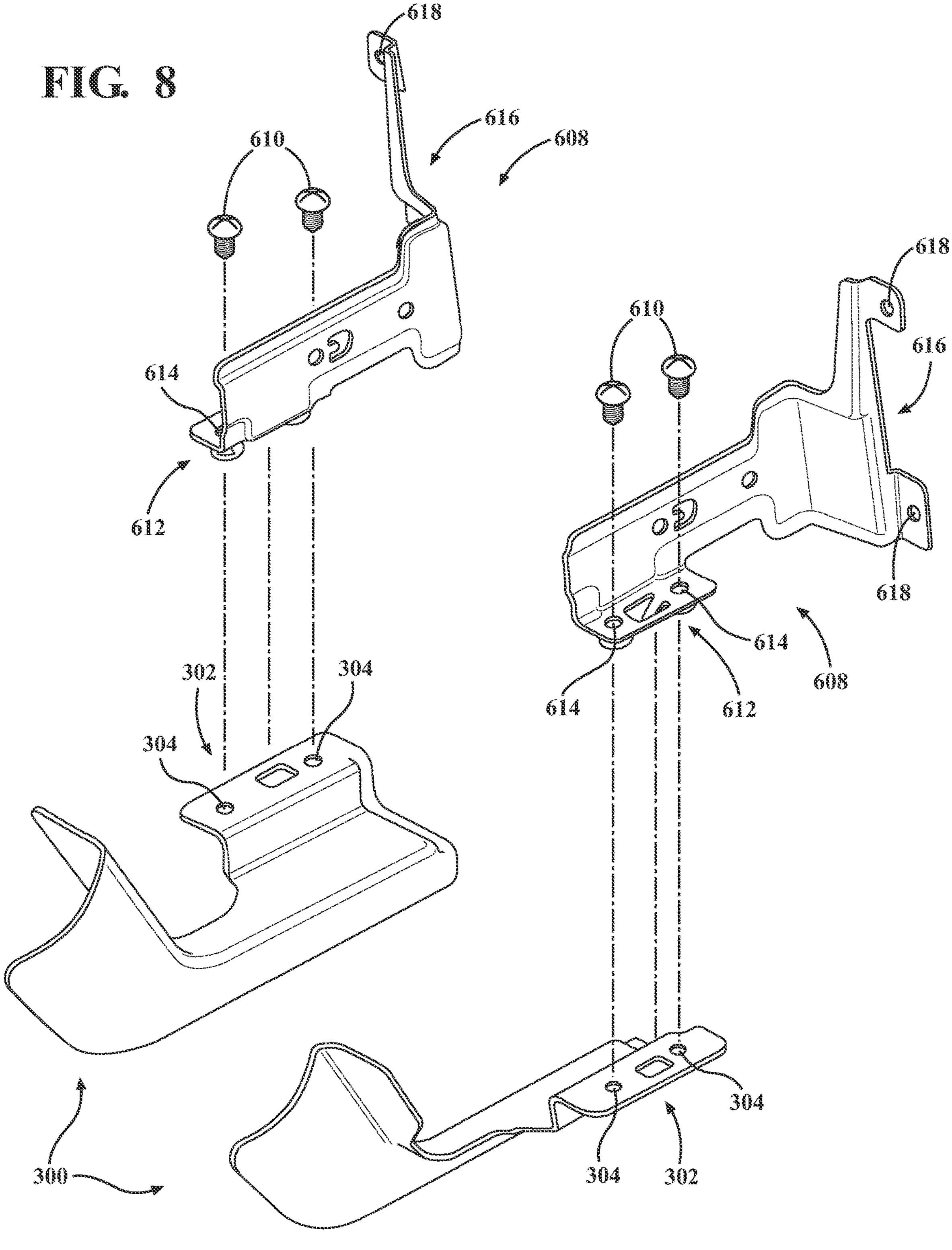
FIG. 8 is a front, perspective view illustrating the connection of display brackets on the display module to support brackets that extend from a crossbeam in the vehicle.

With reference now to FIGS. 7 and 8 as well, the display module 600 will be discussed. The display module 600 is positioned within the opening 202 (FIG. 2) in the instrument panel 200 and may include any suitable components or combination of components, depending upon the particular configuration of the vehicle 10. For example, in the illustrated embodiment, the display module 600 includes a housing 602 (FIGS. 1, 7) that supports a radio 604 and a (touch) screen 606. Embodiments in which the display module 600 may include one or more of a GPS component, temperature controls, one or more knobs, buttons, etc., either in addition to or instead of the radio 604 and/or the screen 606, are also envisioned, however, and would not be beyond the scope of the present disclosure.

In the particular embodiment of the display module 600 seen in FIGS. 1, 2, and 7, the screen 606 is configured so as to define a diagonal length of approximately 9". Embodiments in which the diagonal length of the screen 606 may be varied are also envisioned herein, however, as described in further detail below.

The display module 600 includes (second) display brackets 608, which are configured for (direct) connection to the support brackets 300, whereby the display module 600 is indirectly supported by the crossbeam 100. More specifically, the display brackets 608 and the support brackets 300 are connected via mechanical fasteners 610 (FIGS. 2, 8) (e.g., bolts, screws, rivets, pins, clips, etc.) that extend in a generally vertical orientation (i.e., such that the mechanical fasteners 610 extend in generally orthogonal relation to the length L of the vehicle 10 (and the insertion axis Y) and in generally parallel relation to the height H of the vehicle 10).

The display brackets 608 include (first) flanges 612, which are configured for engagement (contact) with corresponding flanges 302 on the support brackets 300 such that the display brackets 608 are superimposed on the support brackets 300, as seen in FIG. 7. The flanges 302, 612 extend along (i.e., in generally parallel relation to) the length L of the vehicle 10 and include respective openings 304, 614 (FIG. 8), which are configured to receive the mechanical fasteners 610 such that the mechanical fasteners 610 extend through the display brackets 608 and into the support brackets 300.

In order to facilitate connection of the display brackets 608 to the housing 602, the display brackets 608 include (second) flanges 616, which extend in generally orthogonal relation to the flanges 612 and are oriented along (i.e., in generally parallel relation to) the height H (FIG. 2) of the vehicle 10 and the service axis S (FIG. 2). As seen in FIG. 8, the flanges 616 include openings 618, which are configured to receive mechanical fasteners (not shown) such that the mechanical fasteners extend through the flanges 616 and into the housing 602.

Figure 9:
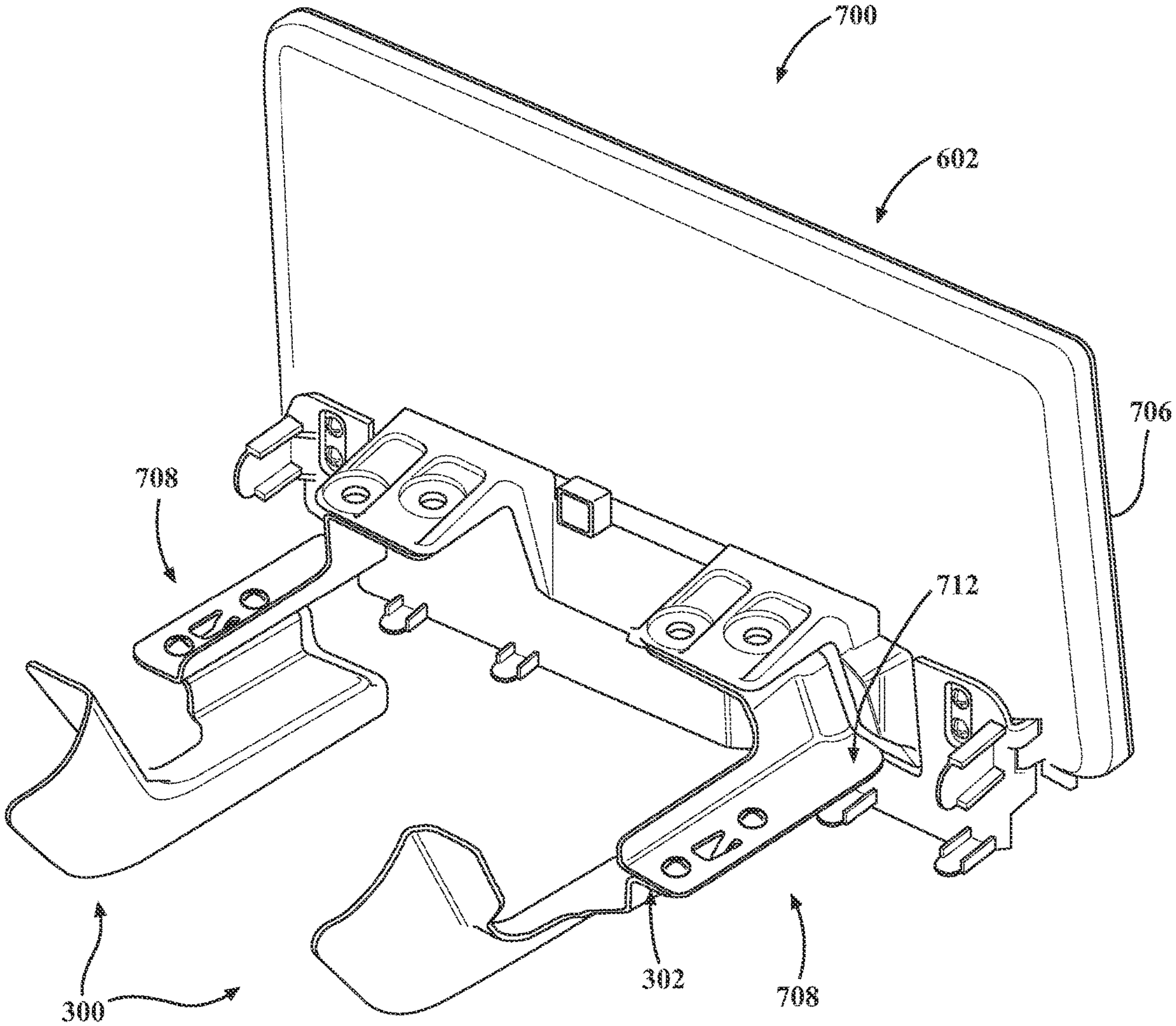
FIG. 9 is a front, perspective view of an alternate embodiment of the display module.
Figure 10:
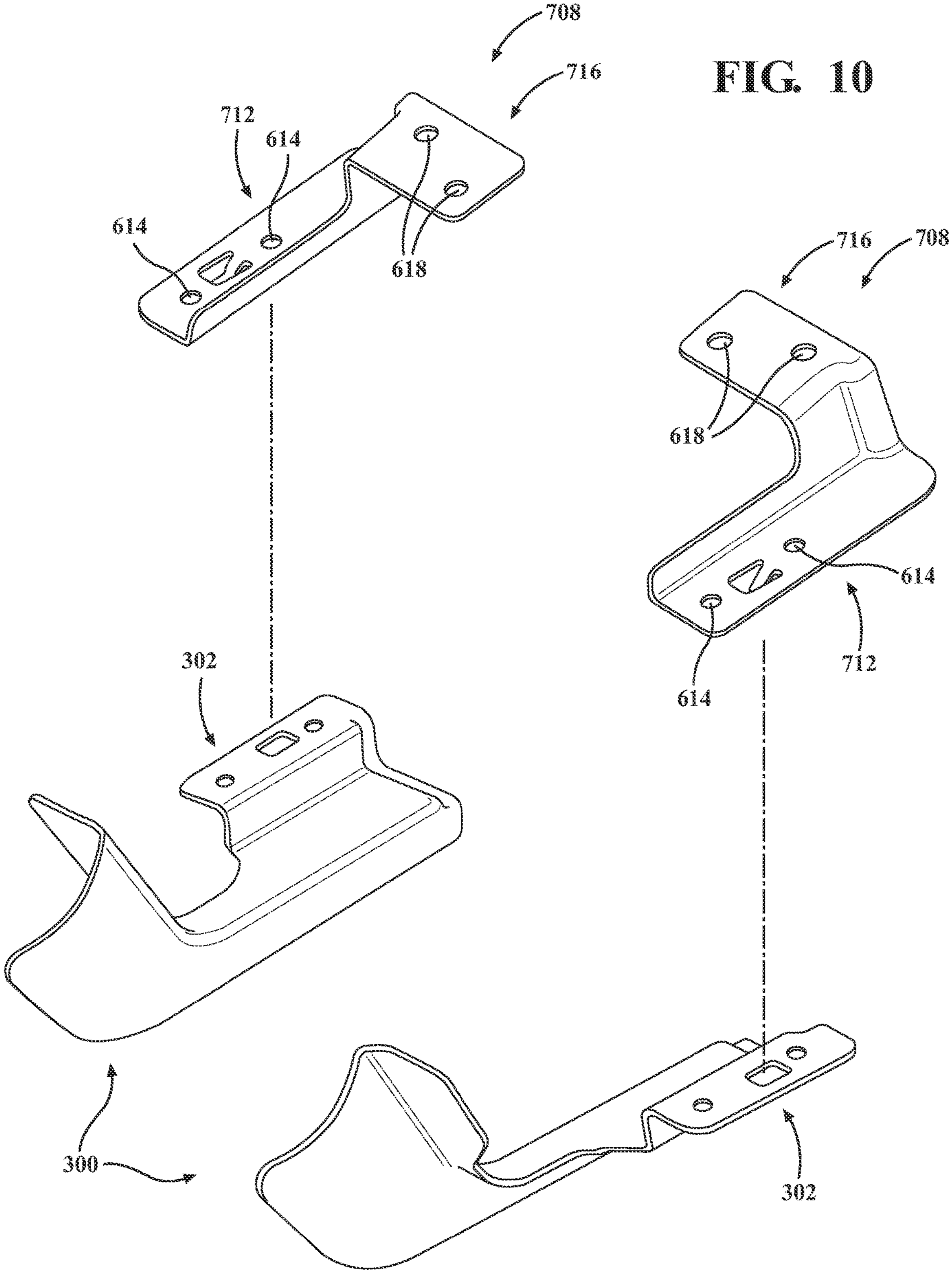
FIG. 10 is a front, perspective view illustrating the connection of display brackets on the display module seen in FIG. 9 to the support brackets.

FIGS. 9 and 10 illustrate a display module 700, which is an alternate embodiment of the display module 600. The display module 700 includes components and features that are similar to the display module 600 (FIGS. 7 and 8) and, accordingly, will only be discussed with respect to differences therefrom in the interest of brevity. As such, identical reference characters will be utilized to refer to elements, structures, features, etc., common to the display module 600 and the display module 700.

The display module 700 includes a larger screen 706 (i.e., in comparison to the screen 606 included on the display module 600), which defines a diagonal length of approximately 12.3". Embodiments in which the diagonal length of the screen 706 may be varied are also envisioned herein (e.g., depending upon the spatial constraints of the instrument panel 200, customer preference, etc.), however. As such, embodiments in which the diagonal length of the screen 706 may exceed 12.3" would not be beyond the scope of the present disclosure.

The display module 700 includes display brackets 708, which are configured for (direct) connection to the support brackets 300 in the manner discussed above. More specifically, the display brackets 708 include (first) flanges 712 that are configured for engagement (contact) with the flanges 302 such that the display brackets 708 are superimposed on the support brackets 300, as seen in FIG. 9. The flanges 712 extend along (i.e., in generally parallel relation to) the length L of the vehicle 10 and include the aforementioned openings 614. The flanges 712 are similar (e.g., identical) in configuration to the flanges 612 on the display brackets 608, whereby the fixing (connection) points between the support brackets 300 and the display brackets 708 established by the mechanical fasteners 610 (FIGS. 2, 8) mirror those between the support brackets 300 and the display brackets 608.

In order to facilitate connection of the display brackets 708 to the housing 602, the display brackets 708 include (second) flanges 716, which include the openings 618 and extend in generally orthogonal relation to the flanges 612. In contrast to the flanges 616 on the display brackets 608, however, the flanges 716 extend laterally and are oriented along (i.e., in generally parallel relation to) the width W (FIG. 1) of the vehicle 10.

With reference now to FIGS. 1-8, a method of assembling the vehicle 10 will be discussed. Initially, the duct assembly 400 (FIGS. 3, 4) (i.e., the pair of side ducts **402*i*, 402*ii* and the center duct 404) is installed in the instrument panel 200 such that the duct assembly 400 is supported thereby, as seen in FIG. 2. More specifically, upon installation of the duct assembly, the center duct 404 is spaced axially from the inner surface 210 of the instrument panel 200 so as to define the access channel 212**.

Following installation of the duct assembly 400, the display module 600 is inserted into the opening 202 (FIG. 2) in the instrument panel 200 along the insertion axis Y in the forward direction 1, and the display module 600 is oriented such that the display brackets 608 (FIGS. 2, 7, 8) are positioned adjacent to the support brackets 300. The installation tool T (FIGS. 2, 6) is then inserted through the opening 204 (FIG. 2) and into the access channel 212 in the instrument panel 200 (i.e., along the height H of the vehicle 10 in a vertically downward direction 2), and the installation tool T is used to (directly) connect the display brackets 608 and the support brackets 300 via the mechanical fasteners 610. The opening 204 and the access channel 212 thus collectively facilitate vertical access to the display brackets 608 (i.e., with the installation tool T) in order to install the mechanical fasteners 610 and thereby connect (secure) the display module 600 within the instrument panel 200.

Following connection of the display module 600 to the support brackets 300, the vent(s) 500 (FIGS. 1, 2) are inserted into the duct assembly 400 (i.e., the center duct 404) through the instrument panel 200 and is secured in relation thereto such that the vent(s) 500 are positioned vertically above the display module 600.

The cover plate 206 (FIGS. 1, 2) is then (removably) installed in the instrument panel 200 (i.e., via insertion into the opening 204) such that the cover plate 206 conceals the access channel 212.

In addition to facilitating assembly of the vehicle 10, vertical access to the brackets 300, 608 and the mechanical fasteners 610 (i.e., via the opening 204 and the access channel 212) also facilitates maintenance of the vehicle 10 during the repair and/or the replacement of various components thereof (e.g., the display module 600, the duct assembly 400, the vent(s) 500, etc.). For example, during the maintenance and/or the replacement of the display module 600, the cover plate 206, the vent(s) 500, and the mechanical fasteners 610 can be removed without disturbing the duct assembly 400 (e.g., the center duct 404), thereby simplifying the process (i.e., in comparison to systems in which the HVAC system requires manipulation and/or disassembly during maintenance and/or replacement), after which, the display module 600 can be removed from the instrument panel 200 (i.e., in a rearward direction 3 (FIG. 1)) and maintained and/or replaced as necessary.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately)) 225° and the term "generally orthogonal" should be understood as referring to configurations in with the pertinent components are oriented so as to define an angle therebetween that is equal to 90°±25% (i.e., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:

a crossbeam extending along a width of the vehicle;

an instrument panel supported by the crossbeam and including an opening;

support brackets connected to the crossbeam;

a display module positioned within the opening in the instrument panel and including display brackets connected to the support brackets such that the display module is supported by the crossbeam;

a duct assembly supported by the instrument panel such that the duct assembly is spaced axially from an inner surface of the instrument panel along a length of the vehicle so as to define an access channel extending vertically to facilitate access to the display brackets and connection of the display module to the support brackets in a vertical direction; and a vent extending into the duct assembly such that the vent is positioned vertically above the display module.

2. The vehicle of claim 1, wherein the duct assembly is configured such that the access channel defines a length extending in generally parallel relation to the length of the vehicle that lies substantially within a range of approximately 80 mm to approximately 120 mm.

3. The vehicle of claim 1, further comprising:

a cover plate removably connected to the instrument panel such that the cover plate conceals the access channel.

4. The vehicle of claim 1, wherein the duct assembly includes:

a pair of side ducts; and a center duct connected to the pair of side ducts.

5. The vehicle of claim 4, wherein the pair of side ducts and the center duct are integrally formed.

6. The vehicle of claim 4, wherein the pair of side ducts and the center duct are formed as discrete components of the duct assembly.

7. The vehicle of claim 6, wherein the pair of side ducts and the center duct are connected via mechanical fasteners.

8. The vehicle of claim 4, wherein the center duct is asymmetrically configured about a centerline thereof extending in generally parallel relation to the length of the vehicle.

9. The vehicle of claim 1, wherein the display brackets include:

first flanges extending in generally parallel relation to the length of the vehicle; and second flanges extending in generally orthogonal relation to the first flanges along a height of the vehicle.

10. The vehicle of claim 1, wherein the display brackets include:

first flanges extending in generally parallel relation to the length of the vehicle; and second flanges extending in generally orthogonal relation to the first flanges along the width of the vehicle.

11. A vehicle comprising:

a crossbeam extending along a width of the vehicle;

an instrument panel supported by the crossbeam and including an opening defining an insertion axis extending in generally parallel relation to a length of the vehicle, wherein the length of the vehicle extends between a front end of the vehicle and a rear end of the vehicle;

support brackets connected to the crossbeam;

a display module positioned within the opening in the instrument panel and including display brackets directly connected to the support brackets by mechanical fasteners extending in generally orthogonal relation to the insertion axis defined by the opening in the instrument panel; and a cover plate removably connected to the instrument panel to facilitate access to the display brackets with an installation tool during connection of the display brackets to the support brackets.

12. The vehicle of claim 11, further comprising:

a duct assembly supported by the instrument panel and including:

a pair of side ducts; and a center duct connected to the pair of side ducts.

13. The vehicle of claim 12, wherein the center duct is spaced axially from an inner surface of the instrument panel along the length of the vehicle so as to define an access channel configured to receive the installation tool and facilitate access to the display brackets.

14. The vehicle of claim 13, wherein the center duct is configured such that the access channel defines a length extending in generally parallel relation to the length of the vehicle that lies substantially within a range of approximately 80 mm to approximately 120 mm.

15. The vehicle of claim 12, further comprising:

a vent extending into the center duct such that the vent is positioned vertically above the display module.

16. A method of assembling a vehicle, the method comprising:

installing a duct assembly in an instrument panel of the vehicle;

inserting a display module into the instrument panel along an insertion axis extending in generally parallel relation to a length of the vehicle, wherein the length of the vehicle extends between a front end of the vehicle and a rear end of the vehicle;

positioning first brackets on the display module adjacent to second brackets connected to a crossbeam extending along a width of the vehicle;

inserting an installation tool into an access channel defined between the duct assembly and the instrument panel; and using the installation tool to directly connect the first brackets and the second brackets via mechanical fasteners such that the mechanical fasteners extend in generally orthogonal relation to the insertion axis of the display module.

17. The method of claim 16, further comprising:

removably installing a cover plate in the instrument panel such that the cover plate conceals the access channel.

18. The method of claim 16, wherein installing the duct assembly includes installing a pair of side ducts and a center duct connected to the pair of side ducts, wherein the center duct is configured such that the access channel defines a length extending in generally parallel relation to the length of the vehicle that lies substantially within a range of approximately 80 mm to approximately 120 mm.

19. The method of claim 18, wherein installing the duct assembly includes positioning the center duct such that the center duct is spaced axially from an inner surface of the instrument panel along the length of the vehicle to thereby define the access channel.

20. The method of claim 18, further comprising:

inserting a vent into the center duct through the instrument panel such that the vent is positioned vertically above the display module.

* * * * *